(12) United States Patent
Kingston et al.

(10) Patent No.: US 7,156,769 B2
(45) Date of Patent: Jan. 2, 2007

(54) ANNULAR MEMBER AND DRIVE DEVICE COMPRISING THE ANNULAR MEMBER

(75) Inventors: Tim Kingston, Eskilstuna (SE); Mats Akerblom, Eskilstuna (SE)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 0 days.

(21) Appl. No.: 11/163,181

(22) Filed: Oct. 7, 2005

(65) Prior Publication Data

US 2006/0019789 A1   Jan. 26, 2006

Related U.S. Application Data

(63) Continuation of application No. PCT/SE04/00670, filed on Apr. 30, 2004.

(30) Foreign Application Priority Data

Apr. 30, 2003   (SE) .................................. 0301265

(51) Int. Cl.
*F16H 57/08* (2006.01)
(52) U.S. Cl. ....................................................... 475/331
(58) Field of Classification Search ................ 475/331; 384/507, 508
See application file for complete search history.

(56) References Cited

U.S. PATENT DOCUMENTS 2,530,660 A * 11/1950 Hoeffleur .................... 384/508
5,097,565 A * 3/1992 Shorey .......................... 16/48
5,398,776 A   3/1995 Forster
2005/0000759 A1* 1/2005 Kngston et al. ........... 188/71.5
2005/0009663 A1* 1/2005 Kingston et al. ........... 475/331
2005/0235774 A1* 10/2005 Tanioka et al. ............... 74/640

FOREIGN PATENT DOCUMENTS

EP         1132632         9/2001
WO     WO 2005033534 A1 *  4/2005

OTHER PUBLICATIONS

International Search Report and International Preliminary Examination Report in corresponding International App. PCT/SE2004/000670.

* cited by examiner

*Primary Examiner*—Sherry Estremsky
(74) *Attorney, Agent, or Firm*—WRB—IP LLP

(57) ABSTRACT

An annular member intended to form a part of a bearing unit includes a first portion which radially externally forms a race for receiving at least one row of balls and radially internally is provided with teeth and forms a gear rim. The first portion is provided with a through-hole in the radial direction through the gear rim, which hole has a sufficiently great cross section to allow introduction of the balls radially from inside into the race.

17 Claims, 4 Drawing Sheets

ANNULAR MEMBER AND DRIVE DEVICE COMPRISING THE ANNULAR MEMBER

The present invention is a continuation of PCT/SE2004/000670, filed Apr. 30, 2004, which claims priority to SE 0301265-5, filed Apr. 30, 2003, both of which are hereby incorporated by reference.

The present invention relates to an annular member intended to form a bearing unit, the annular member comprising a first portion which radially externally forms a race for receiving at least one row of balls and radially internally is provided with teeth and forms a gear rim. The invention also relates to a bearing unit, a device for driving a wheel of a vehicle comprising the bearing unit, and a vehicle comprising the drive device. The invention also relates to a method for assembling the bearing unit.

The invention can be applied, for example, in the manufacture of a drive device for a vehicle which is intended to be driven on a relatively flat surface, such as a road, and/or on uneven ground in the country.

The invention is especially applicable to a vehicle in the form of a working machine, such as a wheel loader or a frame-steered vehicle (what is known as a dumper), but can also be applied in, for example, a truck. The invention will be described below for application in a wheel loader, but this is to be regarded only as an example of an application.

Such a drive device is usually arranged at a wheel which is in turn arranged at one end of a drive axle, and the gear itself is usually referred to as a hub reduction gear. The drive axle is in turn in two parts, and the parts are connected centrally to a differential gear.

U.S. Pat. No. 5,398,776 describes a device for driving a wheel hub. The drive device comprises a bearing unit for bearing the hub and also a planetary gear. An annular member has radially internally a gear rim which forms a ring gear in the planetary gear. The annular member has radially externally races for receiving two rows of balls. The hub is arranged radially outside the annular member, and the rows of balls are arranged between the annular member and the hub.

It is previously known to design such bearing units in different ways for assembly. According to one example, the outer ring in the bearing unit is divided in the axial direction. The balls are placed in the intended position, after which the ring parts are screwed together. One disadvantage of this example is that great precision is required for the component parts, which results in high manufacturing costs.

It is desirable to provide a solution which affords simple and cost-effective assembly while maintaining a strong construction.

According to an aspect of the present invention, a first portion of the annular member is provided with a through-hole in the radial direction through the gear rim, which hole has a sufficiently great cross section to allow introduction of the balls radially from inside into the race. After the introduction of all the balls, a plug is placed in the hole so as to close it and prevent a ball finding its way back into the hole.

Positioning the hole and thus the plug in this first portion of the annular member means that the plug is arranged in a part of the bearing unit which is subjected to relatively low mechanical load during operation of the device. This affords possibilities for a long life.

BRIEF DESCRIPTION OF THE DRAWINGS

The invention will be described in greater detail below with reference to the embodiment shown in the accompanying drawings, in which

FIG. 3 shows a diagrammatic side view of a wheel loader comprising the drive device according to

FIG. 2, and

DETAILED DESCRIPTION

Figure 1:
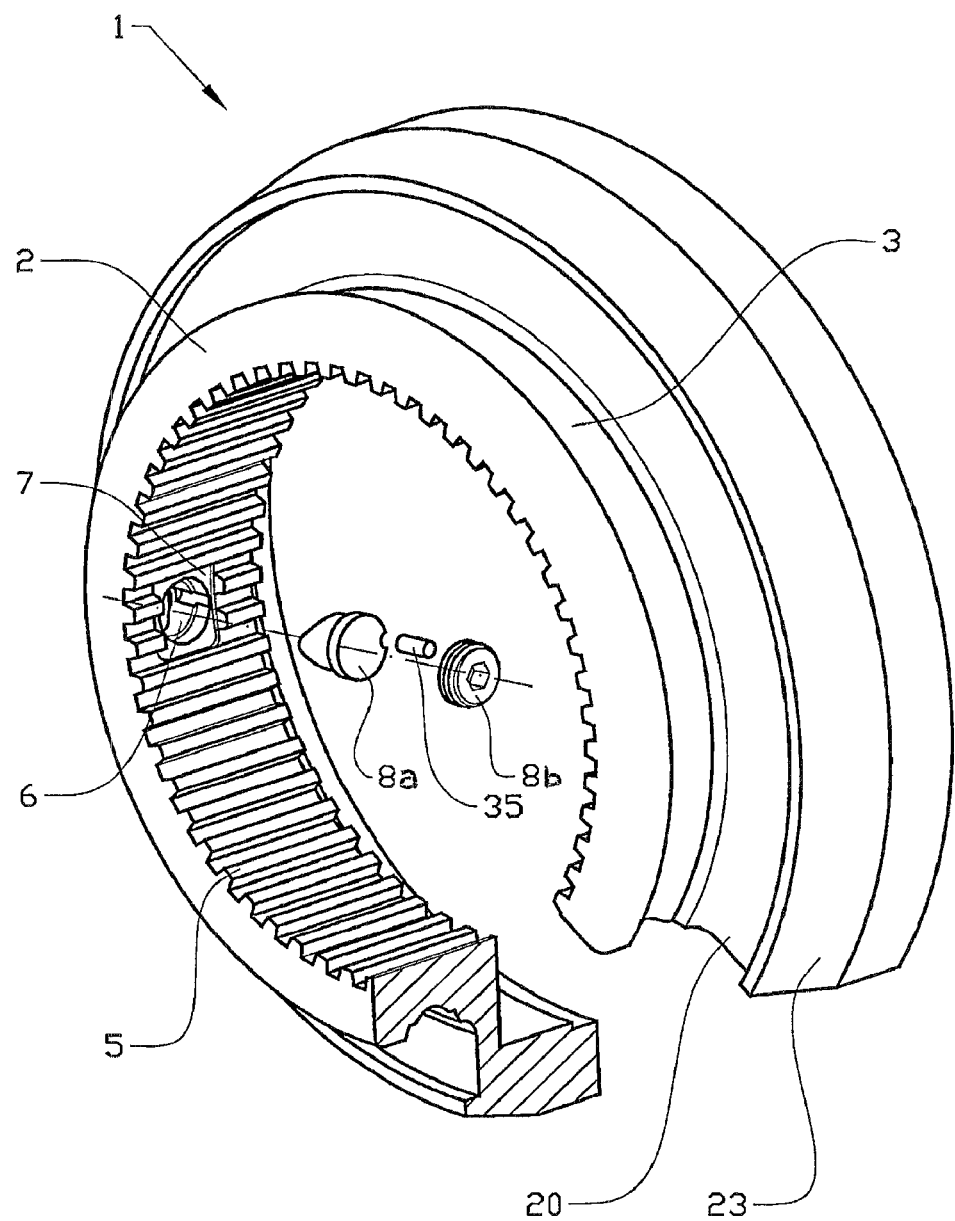
FIG. 1 shows a perspective view of an annular member.
Figure 2:
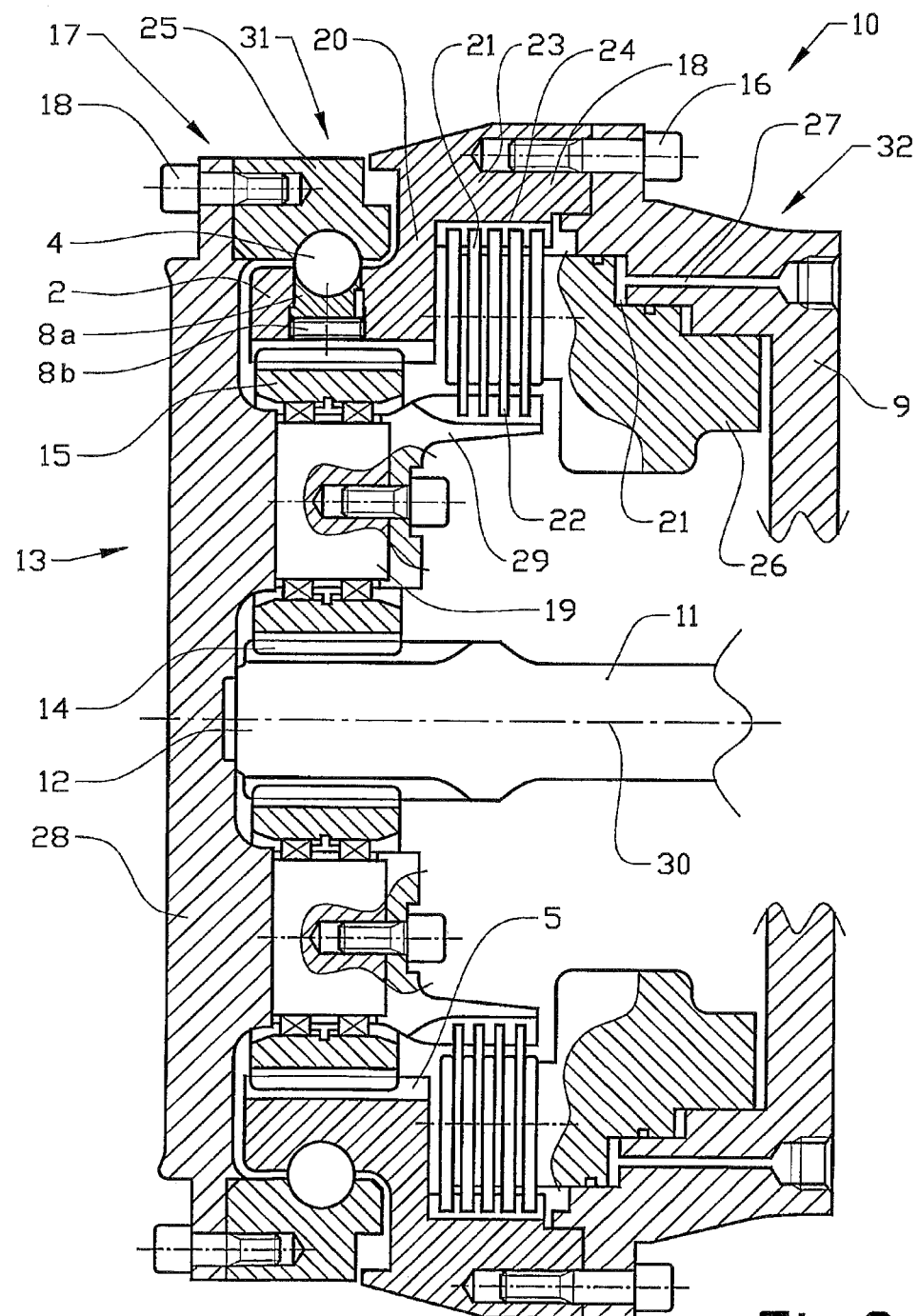
FIG. 2 shows a partly cut-away side view of a device for driving a wheel of a vehicle.
Figure 3:
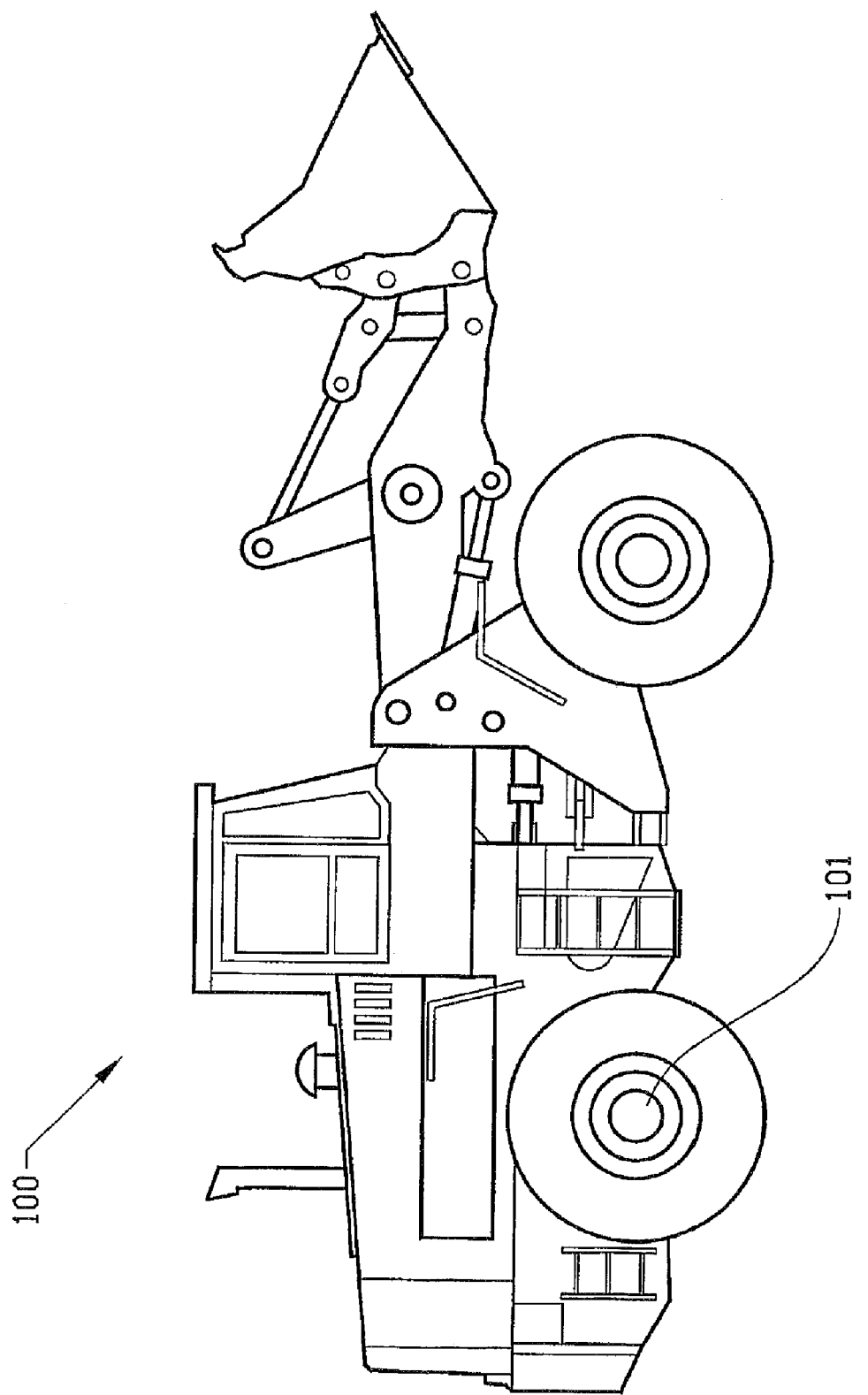

FIG. 1 shows a perspective view of an annular member 1 which is intended for a drive device 10 (see FIG. 2). The drive device 10 is in turn intended to be adapted to drive a wheel 101 of a vehicle, such as a wheel loader 100 (see FIG. 3).

The annular member 1 comprises a first portion 2 which radially externally forms a race 3 for receiving at least one row of balls 4 (see FIGS. 1 and 2) and radially internally is provided with teeth and forms a gear rim 5. A hub 17 is mounted against the annular member 1 via said row of balls 4. The first portion 1 has the shape of a ring which is continuous in the peripheral direction, and has a greater extent in the axial direction than in the radial direction.

As stated, the bearing arrangement between the hub 17 and the annular member 1 comprises a row of a number of balls arranged along a circular track between races designed in the hub 17 and the annular member 1. Such a bearing arrangement is often referred to as a four point bearing owing to the fact that four surfaces are ground for contact with the balls. In order to form the bearing arrangement, a number of balls are therefore mounted in between the annular member 1 and the hub 17. In other words, there is no conventional ball bearing between the parts. Race means that a surface area is designed for receiving the balls. This surface area usually has a curved or angled shape.

The first portion 2 is provided with a through-hole 6 in the radial direction through the gear rim 5. The hole 6 opens in the race 3 and has a sufficiently great cross section to allow introduction of the balls radially from inside into the race.

The teeth in the gear rim 5 are concave with a relatively wide bottom. The result of this is that the hole 6 does not constitute any appreciable reduction in strength. The tooth pressure between the planet wheel 15 and the gear rim 5 is also considerably lower than the surface pressure between the sun gear 14 and the planet wheel 15. The result of this is that the hole 6 does not constitute any appreciable reduction in strength.

When the annular member 1 is manufactured, an area 7 is first cleared so that the surface within the area is relatively smooth, that is to say free of teeth. One or more teeth will therefore have a discontinuity for this area 7. The hole 6 is then drilled through the first portion 2 in the cleared area 7. The cleared area 7 has a rectangular shape, for example, but can alternatively have another shape, such as round or oval. The area 7 is made sufficiently large for the entire hole 6 to be accommodated within it, but as small as possible so as to influence the strength of the tooth engagement as little as possible.

FIG. 1 also shows a plug 8 which has essentially the same circumference as the hole 6 and is intended to be placed in the hole 6, after introduction of the balls 4, in order to close the hole.

To be precise, the plug 8 comprises two parts 8a, 8b. The first part 8a, which is arranged facing the balls 4, is hardened and rotationally guided by a pin 35. The second part 8b has external threading and is sealed in relation to the hardened part 8a by an0 ring. The second part 8b is arranged sealingly radially against the inner surface of the hole 6 with what is known as lock-tight (which means that the threads are provided with a preparation which, after the plug has been placed in the intended position, swells and locks the plug firmly).

FIG. 2 shows an embodiment of the drive device 10 in a diagrammatic side view. The drive device 10 is arranged at one end of the axle case 9 of a wheel axle 32. A drive axle 11 extends inside the axle case 9. The drive axle 11 is, at one 12 of its ends, provided with a hub reduction gear 13 in the form of a planetary gear. The hub 17 is therefore driven by the drive device 10. The wheel 101 of the wheel loader 100 (see FIG. 3) is intended to be connected to the hub 17 via a number of wheel bolts 18. At its other end, the drive axle 11 is operationally connected to a central gear (not shown) which, via a transmission, is driven by the engine (not shown) of the wheel loader 100.

According to conventional art, the planetary gear 13 comprises a sun gear 14, a number of planet wheels 15 and a ring gear, formed by said gear rim 5, which are arranged in driving interconnection via teeth. The planetary gear 13 is of a type with a stationary ring gear, and the annular member 1 is here connected firmly to the axle case 9 via screw joints 16. The gear rim is therefore intended to form a static ring gear, forming part of a planetary gear, for tooth engagement with the planet wheels in the planetary gear.

The hub 17 comprises axially inwardly projecting pivots 19 which form carriers for the planet wheels 15. The pivots 19 are therefore formed in one piece with the hub 17. To be precise, the planet wheels 15 are mounted on the pivots 19.

The first portion 2 of the annular member 1, the hub 17 and the row of balls 4 therefore form a bearing unit 31. When the bearing unit 31 is assembled, the annular member 1 is first positioned so that the first portion 2 is located radially inside the bearing portion 25 of the hub 17. The first plug part 8a is then placed in the intended position in the hole 6, which has been drilled previously in the cleared area 7. The race is then ground with the first plug part 8a in said intended position. The first plug part 8a is then removed, the balls 4 are introduced radially from inside through the hole 6 into the race 3, the first plug part 8a is replaced in the correct position, and then the second plug part 8b is screwed into its intended position.

The drive device 10 also comprises a braking device 21. The braking device 21 consists of a wet brake in the form of a multiple-disk brake comprising a number of disks 22, and the braking device 21 is adapted to brake the hub 17 relative to the axle case 9. To this end, the annular member 1 comprises a second portion 20, which forms a pressure surface for the disks in the braking device 21. The second portion 20 extends essentially in the radial direction, that is to say essentially at right angles to the first portion 2, which has a mainly axial extent. To be precise, the second portion 20 extends radially outward from one end of the first portion 2. The annular member 1 also comprises a third portion 23, which extends essentially in the axial direction and is arranged at a distance in the radial direction from the first portion 2.

The braking device 21 comprises two sets of brake disks which rotate in relation to one another during operation. A first set of brake disks (stator disks) is arranged in engagement with means 24 arranged radially internally in the third portion 23 of the annular member 1, which portion 23 extends in the axial direction from the second portion 20. Said engagement means 24 can consist of splines, pins, or another linear guide, such as bars with a half-moon shape. A second set of brake disks (rotor disks) is connected to the pivots 19 which project through the planet wheels 15. The pivots 19 have similar engagement means, such as splines, for engagement with the rotor disks when the braking device 21 is activated. In the embodiment illustrated in FIG. 1, a further part 29 is connected firmly to the pivots 19 and, to be precise, it is this part 29 which has said engagement means.

The brake disks are connected to the respective part in a rotationally fixed manner and are displaceable in the axial direction on said spline joints. In a conventional manner, the brake disks belong alternately to the first set and to the second set. The hub 17 is in this way braked in relation to the static part 9.

The braking device 21 also comprises a brake piston 26 for applying the brake by pressing the brake disks together and thus increasing the friction between them. A duct 27 for supplying oil for applying the brake is coupled to the brake piston. On an opposite side of the brake disks relative to the brake piston 26, the second portion 20 of the annular member 2 forms a pressure surface, or stay, against which the disks are brought when the brake is applied. The second portion 20 is annular, and the pressure surface extends, to be precise, in a plane essentially at right angles to a central axis 30 of the annular first portion 2.

The first portion 2 of the annular member 1 is therefore arranged in a first position in the radial direction. The third portion 23 of the annular member 1 is furthermore arranged in a second position at a greater distance in the radial direction than the first portion. The second portion 20 of the annular member 2, which forms the pressure surface for the brake disks, is arranged between the first and third portions. The first and third portions 2, 23 also project in different directions in the axial direction from the second portion 20. The first, second and third portions of the annular member are therefore integrated in one piece.

In the embodiment shown, the hub 17 comprises an annular part 25 and a disk-shaped cover 28 connected firmly to the annular part 25. The annular part 25 is arranged outside the first portion 2 in the radial direction and is also mounted against it. The annular part 25 and the disk-shaped cover 28 are interconnected firmly via screw joints. The cover 14 is arranged outside the planetary gear in the axial direction and protects the latter from the external environment.

Figure 4:
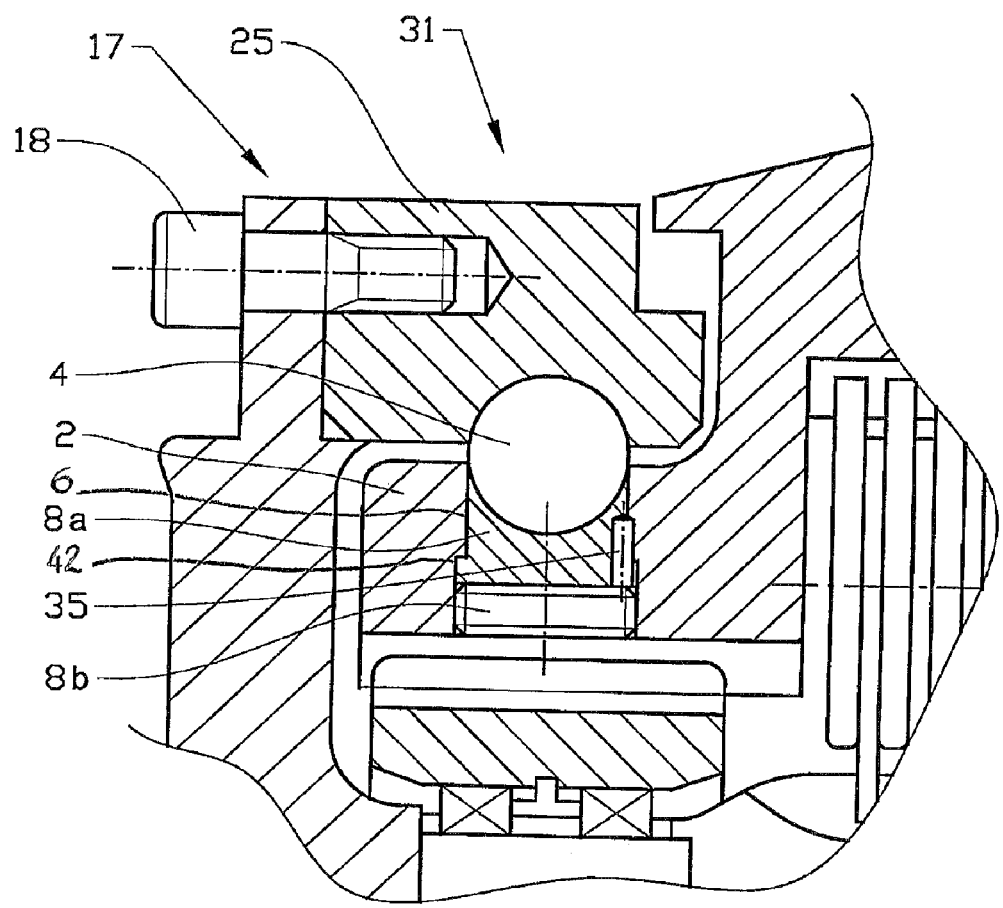
FIG. 4 shows an enlarged illustration of a part of the drive device according to FIG. 2.

FIG. 4 shows an enlarged illustration of the annular member 1 which is provided with the hole 6 and the plug 8a, 8b. The first portion 2 is, in the hole 6, provided with a shoulder 42, or stop surface, which limits the movement of the first plug part 8a in the longitudinal direction of the hole, that is to say in the radial direction of the device. To be precise, the hole 6 has a greater diameter on the gear ring side than on the bearing side. The transition between the different diameters takes place in a stepped manner with the aid of said shoulder. The first plug part 8a is correspondingly designed with a first portion with a greater diameter and a second portion with a smaller diameter, the transition between the two portions being in the form of a step.

The word "annular" used above is to be understood in a wide sense, and the term annular includes various forms of at least essentially circular structures which are continuous in the peripheral direction. The first annular portion 2 has the shape of a ring and consists of a continuous structure in the peripheral direction with an extent in the axial direction. The inner surface of the first portion 2 in the radial direction also defines an essentially circular shape and comprises said gear rim.

FIG. 1 also shows the bearing arrangement in the form of a row of balls which are received in races in the hub and the ring gear. According to a variant, use is made of two rows of balls, which rows are arranged with a mutual spacing in the axial direction. This type of bearing arrangement is usually referred to as an angular contact bearing.

The multiple disk brake described above is sometimes referred to as a friction brake, and one set of brake disks is then referred to as friction disks while the other set of brake disks is referred to as reaction disks.

The invention is not to be regarded as being limited to the illustrative embodiments described above, but a number of further variants and modifications are conceivable within the scope of the patent claims which follow. For example, the application may differ, or the engine of the vehicle may be arranged so as to drive the drive axle directly, that is to say without an intermediate drive shaft and central gear.

It is possible to define the device 10 for driving a wheel of a vehicle as follows: the device comprises a planetary gear 13 for transmitting power from a drive axle 11 to a wheel hub 17, on which the wheel is intended to be arranged, the planetary gear 13 comprising a sun gear 15 connected to the drive axle 11, a planet carrier 19, on which at least one planet wheel 15 is arranged, which planet wheel is also arranged in engagement with the sun gear, and a stationary ring gear 5, the device also comprising a bearing unit 31 which in turn comprises an annular member 1 which forms the ring gear in the planetary gear and comprises a first portion 2 which radially internally is provided with teeth and forms a gear rim 5 for the planet wheels and radially externally forms a race 3 for receiving at least one row of balls 4, the bearing unit also comprising an annular portion 25 intended for rotation which constitutes a part of the wheel hub 17 and is designed so as radially internally to receive said. row of balls 4, the first portion 2 being provided with a through-hole 6 in the radial direction through the gear rim, which hole has a sufficiently great cross section to allow introduction of the balls 4 radially from inside into the race 3.

The hub 17 also comprises axially inwardly projecting pivots 19 which form carriers for the planet wheels.

The annular member 1 is also connected firmly to an axle case 9.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

What is claimed is:

1. An annular member for forming a static gear rim forming part of a planetary gear, the annular member comprising a first portion which radially externally forms a race for receiving at least one row of balls and radialy internally is provided with teeth and forms a gear rim, the first portion being provided with a through-hole in a radial direction through the gear rim, the hole having a sufficiently great cross section to allow introduction of balls radially from inside into the race.

2. The annular member as claimed in claim 1, wherein the first portion is ring-shaped and continuous in the peripheral direction.

3. The annular member as claimed in claim 2, wherein the bearing unit forms a bearing for a hub, the hub comprising a portion designed so as to radially internally receive a row of balls radially externally received in the race.

4. The annular member as claimed in claim 1, wherein the bearing unit forms a bearing for a hub, the hub comprising a portion designed so as to radially internally receive a row of balls radially externally received in the race.

5. The annular member as claimed in claim 1, wherein the teeth in a region of the through hole are concave.

6. A bearing unit comprising:
   an annular member for forming a static gear rim forming part of a planetary gear, the annular member comprising a first portion which radially externally forms a race for receiving at least one row of balls and radially internally is provided with teeth and forms a gear rim, the first portion being provided with a through-hole in a radial direction through the gear rim, the hole having a sufficiently great cross section to allow introduction of balls radially from inside into the race; and
   an annular portion adapted to radially internally receive a row of balls radially externally received in the race, the annular member and the annular portion being arranged one outside the other in the radial direction such that the row of balls is adapted to be received between them.

7. The bearing unit as set forth in claim 6, wherein the teeth in a region of the through hole are concave.

8. A device for driving a wheel of a vehicle, which device comprises:
   a planetary gear for transmitting power from a drive axle to a wheel hub, the wheel being arranged on the wheel hub;
   a bearing unit comprising an annular member for forming a static gear rim forming part of a planetary gear, the annular member comprising a first portion which radially externally forms a race for receiving at least one row of balls and radially internally is provided with teeth and forms a gear rim, the first portion being provided with a through-hole in a radial direction through the gear rim, the hole having a sufficiently great cross section to allow introduction of balls radially from inside into the race, and an annular portion adapted to radially internally receive a row of balls radially externally received in the race, the annular member and the annular portion being arranged one outside the other in the radial direction such that the row of balls is adapted to be received between them, the annular member forming a ring gear in the planetary gear; and
   a plug disposed in the hole, and
   wherein the annular portion comprises a portion of the wheel hub.

9. The device as claimed in claim 8, wherein the planetary gear comprises a sun gear connected to the drive axle, a planet carrier, on which at least one planet wheel is arranged, the at least one planet wheel also engaging the sun gear and the ring gear.

10. The device as claimed in claim 9, wherein the hub comprises axially inwardly projecting pivots which form carriers for the planet wheels.

11. The device as claimed in claim 10, wherein the annular member is connected to an axle case.

12. The device as claimed in claim 8, wherein the annular member is connected to an axle case.

13. The device as claimed in claim 8, wherein the hub comprises axially inwardly projecting pivots which form carriers for the planet wheels.

14. The device as claimed in claim 13, wherein the annular member is connected to an axle case.

15. The device as set forth in claim 8, wherein the teeth in a region of the through hole are concave.

16. A vehicle comprising:
   a wheel; and
   a device for driving the wheel, the device comprising
      a planetary gear for transmitting power from a drive axle to a wheel hub, the wheel being arranged on the wheel hub,
      a bearing unit comprising an annular member for forming a static gear rim forming part of a planetary gear, the annular member comprising a first portion which radially externally forms a race for receiving at least one row of balls and radially internally is provided with teeth and forms a gear rim, the first portion being provided with a through-hole in a radial direction through the gear rim, the hole having a sufficiently great cross section to allow introduction of balls radially from inside into the race, and an annular portion adapted to radially internally receive a row of balls radially externally received in the race, the annular member and the annular portion being arranged one outside the other in the radial direction such that the row of balls is adapted to be received between them, the annular member forming a ring gear in the planetary gear, and
      a plug disposed in the hole, and
   wherein the annular portion comprises a portion of die wheel hub.

17. The device as set forth in claim 16, wherein the teeth in a region of the through hole are concave.

* * * * *